United States Patent Office 3,296,829
Patented Jan. 10, 1967

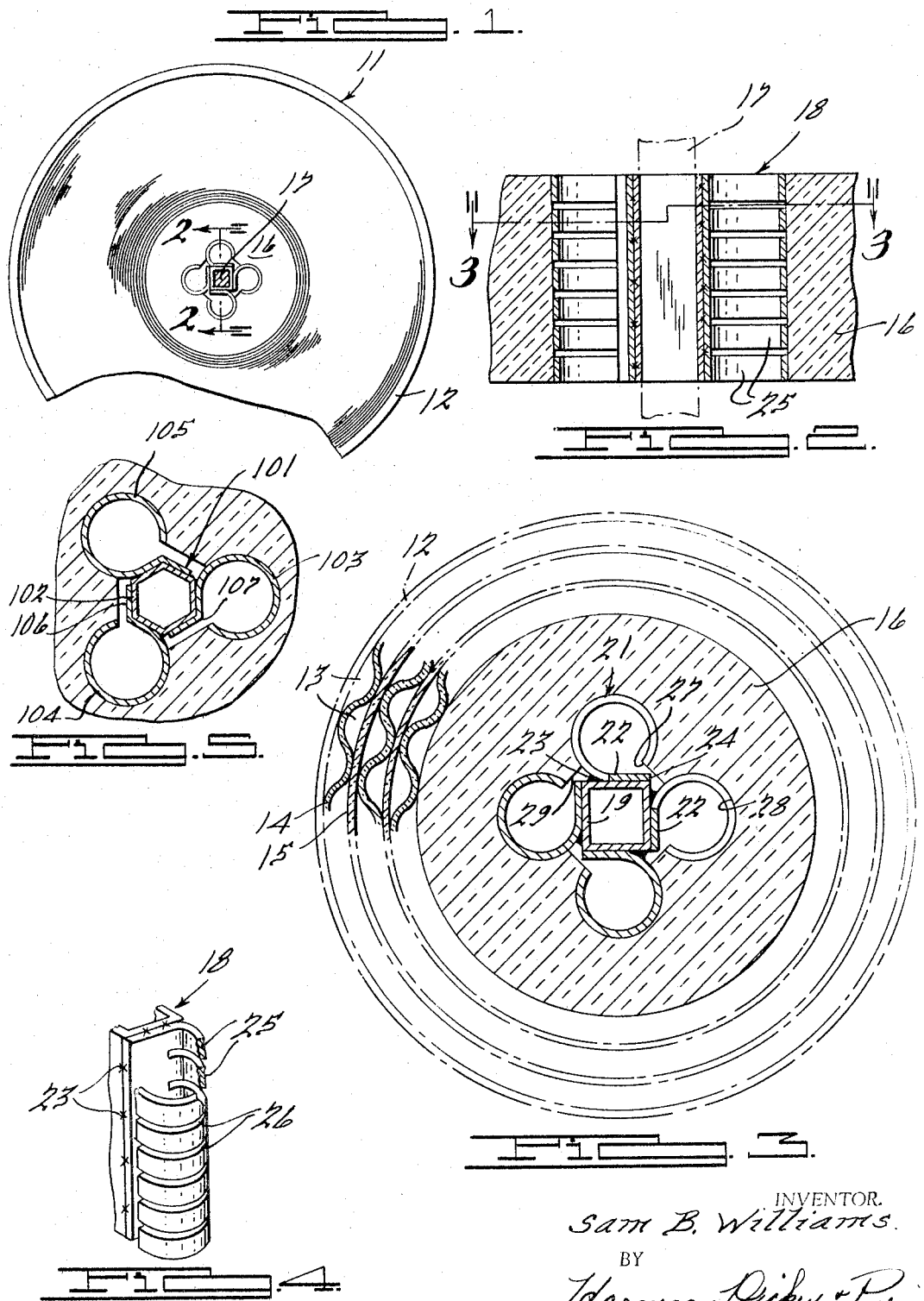

3,296,829
SHAFT-TO-HUB COUPLING FOR
NON-METALLIC HUBS
Sam B. Williams, Walled Lake, Mich., assignor to Williams Research Corporation, Walled Lake, Mich., a corporation of Michigan
Filed June 23, 1965, Ser. No. 466,224
5 Claims. (Cl. 64—15)

This invention relates to shaft couplings for hubs, and more particularly to means for coupling driving shafts to rotary matrix regenerators of the type used as heat exchangers for gas turbines.

It is an object of the invention to provide a novel and improved coupling of this nature which is especially adapted for use with hubs fabricated of material such as certain glass-ceramic materials, which have coefficients of thermal expansion substantially different than those of the metallic shafts on which they are mounted.

It is a further object to provide an improved coupling of this character which avoids undue stress concentration in hubs made of glass-ceramic and similar materials.

It is another object to provide an improved shaft-to-hub coupling of this character which will permit limited rocking of a rotary matrix regenerator with respect to its driving shaft during operation, without stress concentrations arising from such shifts.

It is also an object to provide an improved coupling having these characteristics, which will also have the ability to act as a frictional damping device when the regenerator tends to move axially with respect to the shaft, for example due to jarring of the gas turbine assembly, and will permit axial adjustment of the regenerator to compensate for different sizes of the seals which engage the regenerator.

Other objects, features and advantages of the present invention will become apparent from the subsequent description, taken in conjunction with the accompaning drawings.

In the drawings:

FIGURE 1 is an overall side elevational view of a rotary matrix regenerator of a glass ceramic type, showing the coupling of the present invention connected between the regenerator hub and its driving shaft;

FIGURE 2 is a cross-sectional view taken along the line 2—2 of FIGURE 1 and showing the construction of the coupling;

FIGURE 3 is a cross-sectional view taken along the line 3—3 of FIGURE 2 and showing the manner in which the four sets of spring fingers engage the hub recesses;

FIGURE 4 is a fragmentary perspective view, parts being broken away and showing the construction of one set of spring teeth; and FIGURE 5 is a top plan view of a modified form of the invention for use with a hexagonal shaft.

Briefly, each of the illustrated embodiments of the invention comprises an elongated hollow member of non-circular cross-sectional shape adapted to surround and be secured to a driving shaft of complementary cross-sectional shape. A plurality of sets of spring fingers are secured to the sides of this elongated member. Each set of spring fingers is of generally comb-like construction, comprising a base portion secured to the elongated hollow member and spring-like fingers which extend outwardly from the base portion and are of almost completely circular shape. These sets of spring fingers fit into recesses in a hub, the illustrated hub being a glass ceramic hub of an axial flow rotary matrix regenerator.

The drive is in the direction of the outer ends of the spring teeth, the teeth fitting snugly in the recesses so that the teeth will tend to be flexed by the forces existing between the hub and fingers. Any differential expansion between the hub and shaft will be taken up by the resilent fingers, as will tilting of the regenerator with respect to the shaft. Axial movement of the regenerator with respect to the shaft will be frictionally damped by the rubbing of the hub on the outer surfaces of the fingers, but such axial adjustment will nevertheless be permitted.

Referring more particularly to the drawings, a rotary matrix generator is generally indicated at 11, this matrix being of the type used in gas turbines for heat regeneration purposes. Commonly, such a matrix has an outer rim 12, and a large number of passages indicated at 13 in FIGURE 3, these passages being formed by members such as those indicated at 14 and 15 in this figure. Passages 13 extend axially through the regenerator, and the material of which members 14 and 15 are fabricated will retain heat imparted during one portion of its rotation by the exhaust gases, and yield this heat to compressed air passing through passages 13 in another portion of its rotation. Conventionally, spring-urged seals (not shown) engage the oppositely facing flat surfaces of generator 11 to separate the compressed air and exhaust gas ducts. These oppositely facing regenerator surfaces operate at substantially different temperatures, and to minimize distortion due to the temperature differential, a known matrix is fabricated of a glass-ceramic material having a very low temperature coefficient of expansion. A hub 16 is provided for regenerator 11, this hub also being fabricated of a glass ceramic material.

The driving shaft for regenerator 11 is indicated at 17, and is shown as having a square cross-sectional shape in the vicinity of the regenerator.

The novel coupling of this invention is generally indicated at 18. The coupling comprises an elongated hollow metal member 19 of square cross-sectional shape which fits over and is secured to shaft 17. Four spring finger units, each of which is generally indicated at 21, are secured to the outer surface of member 19, and more particularly to the four sides thereof. Each member 21 is fabricated of metal having spring-like properties, and is of a length corresponding to that of member 19. Each member 21 has a flat base portion 22 flush with the outer surface of member 19 and secured thereto by such means as brazing, as indicated at 23. One edge 24 of base portion 22 coincides with an edge of member 19, and base portion 22 is somewhat less than the full width of the corresponding side of member 19.

Spring fingers 25 extend outwardly from base portion 22 and are arcuate in shape, being separated by slots 26. The radius of curvature of fingers 25 is constant, and is such that the fingers extend a considerable distance outwardly from base portion 22. The outer ends 27 of fingers 25 are slightly spaced from base portion 22. All four sets of fingers 25 extend in the same direction, that is, they curve from base portion 22 in a clockwise direction as seen in FIGURE 3.

Hub 16 is provided with four arcuate recesses 28 which are equidistantly spaced, and are inwardly open to a central recess through which shaft 17 extends, the arcuate recesses being connected by flat portions 29, as seen in FIGURE 3. The radius of curvature of recesses 28 is the same as or slightly less than that of the outer surfaces of fingers 25, and the fingers are disposed in these recesses. The fit is snug to the extent that there will be no appreciable free angular play of the fingers within the recesses, but axial movement of hub 16 with respect to coupling 18 will be permitted, this movement being resisted by the frictional forces existing between spring fingers 25 and recesses 28. The thickness of hub 16 is equal to the length of coupling 18, so that all fingers 25 will fully engage recesses 28, as seen in FIGURE 2.

In operation, shaft 17 and therefore coupling 18 will be driven in a clockwise direction as shown in FIGURE 3. This will drive matrix 11 in the same direction by means of the force exerted on hub 16 by spring fingers 25.

As indicated previously, the glass-ceramic matrix will have no appreciable coefficient of thermal expansion, and expansion and contraction of shaft 17 will not be interfered with by the matrix because of the presence of coupling 18. More particularly, spring fingers 25 will flex with such thermally induced dimensional changes, thereby maintaining at all times a fully operative coupling between the shaft and matrix without creating the danger of damage to the matrix.

During the driving of matrix 11, the driving forces will be distributed over a wide area, that is, the areas of contact of spring fingers 25 with hub 16. This will minimize the possibility of undue stress concentrations on the matrix hub.

Should jarring of the gas turbine assembly tend to move matrix 11 axially with respect to the shaft, such axial movement will be frictionally damped by the contact between fingers 25 and hub 16. Axial movement will be permitted, however, and this will allow adjustment of the matrix to compensate for different sizes or tolerances of the spring seals (not shown) which engage its opposite faces. Any angular rocking, tilting or wobbling of the matrix with respect to the shaft will also be permitted to a limited extent by coupling 18, and more particularly by the fact that the spring fingers 25 at one end or the other of coupling 18, and in any one or more of the four sets, may flex relative to the other spring fingers.

FIGURE 5 shows a modified form of the invention for use with a hexagonal shaft. The coupling is generally indicated at 101 and has a hollow elongated six-sided member 102 which is the equivalent of member 19 in the first embodiment. This member is adapted to be secured to a hexagonal portion of a shaft. Three sets of spring fingers 103, 104 and 105 are provided, these sets being secured to alternate sides of member 102. More particularly, each set of spring fingers has a base portion 106 secured to two adjacent sides of member 102, base portion 106 being bent at 107 for this purpose. Spring fingers 103 extend outwardly from base portion 107 and are formed in a manner similar to that of the previous embodiment.

While it will be apparent that the preferred embodiments of the invention disclosed are well calculated to fulfill the objects above stated, it will be appreciated that the invention is susceptible to modification, variation and change without departing from the proper scope or fair meaning of the subjoined claims.

What is claimed is:

1. In a shaft-to-hub coupling, a hollow elongated member, and a plurality of sets of spring fingers secured to angularly spaced side portions of said member and extending outwardly therefrom, each set of spring fingers comprising a base portion secured to the corresponding side of said elongated member and a plurality of identically shaped arcuate spring-like fingers extending outwardly from one edge of said base portion and forming the major portion of a complete circle, the outer ends of said spring fingers being adjacent said base portion.

2. In a shaft-to-hub coupling, a shaft having a non-circular cross-sectional shape, a coupling comprising a sleeve of corresponding non-circular cross-sectional shape surrounding and secured to said shaft, and at least two sets of spring fingers secured in angularly spaced relation to said sleeve and extending outwardly therefrom, each set of spring fingers comprising a base portion secured to said sleeve and a plurality of arcuate spring fingers extending outwardly from said base portion and forming a substantial portion of a circle, slots being formed between said spring fingers.

3. In a shaft-to-hub coupling, a shaft having a square cross-sectional shape, a coupling comprising a sleeve of corresponding square cross-sectional shape surrounding and secured to said shaft, and four sets of spring fingers secured in angularly spaced relation to said sleeve and extending outwardly therefrom, each set of spring fingers comprising a base portion secured to a flat side of said sleeve and a plurality of arcuate spring fingers extending outwardly from said base portion and forming a substantial portion of a circle, slots being formed between said spring fingers.

4. In a shaft-to-hub coupling, a shaft having a hexagonal cross-sectional shape, a coupling comprising a sleeve of corresponding hexagonal cross-sectional shape surrounding and secured to said shaft, and three sets of spring fingers secured in angluarly spaced relation to said sleeve and extending outwardly therefrom, each set of spring fingers comprising a base portion secured to two adjacent sides of said hexagonal sleeve and a plurality of arcuate spring fingers of identical shape extending from one edge of said base portion and forming a substantial portion of a circle.

5. In a shaft-to-hub coupling, a shaft having a non-circular cross-sectional shape, a coupling comprising a sleeve of corresponding non-circular cross-sectional shape surrounding and secured to said shaft, at least two sets of spring fingers secured in angularly spaced relation to said sleeve and extending outwardly therefrom, each set of spring fingers comprising a base portion secured to said sleeve and a plurality of arcuate spring fingers extending outwardly from said base portion and forming a substantial portion of a circle, slots being formed between said spring fingers, and a hub having a central aperture within which said shaft and sleeve are disposed and arcuate recesses connected to said central aperture and within which said sets of spring fingers are disposed, the spring fingers being in frictional engagement with said arcuate recesses, whereby rocking movement and axial movement of said hub with respect to said shaft will be permitted.

References Cited by the Examiner

UNITED STATES PATENTS

| | | | |
|---|---|---|---|
| 1,126,631 | 1/1915 | Haeppner | 152—73 |
| 1,475,902 | 11/1923 | Thompson | 64—27 |
| 2,042,069 | 5/1936 | Maurer | 64—15 |
| 2,858,682 | 11/1958 | Fawick | 64—15 |

FRED C. MATTERN, Jr., *Primary Examiner.*

H. C. COE, *Assistant Examiner.*